UNITED STATES PATENT OFFICE.

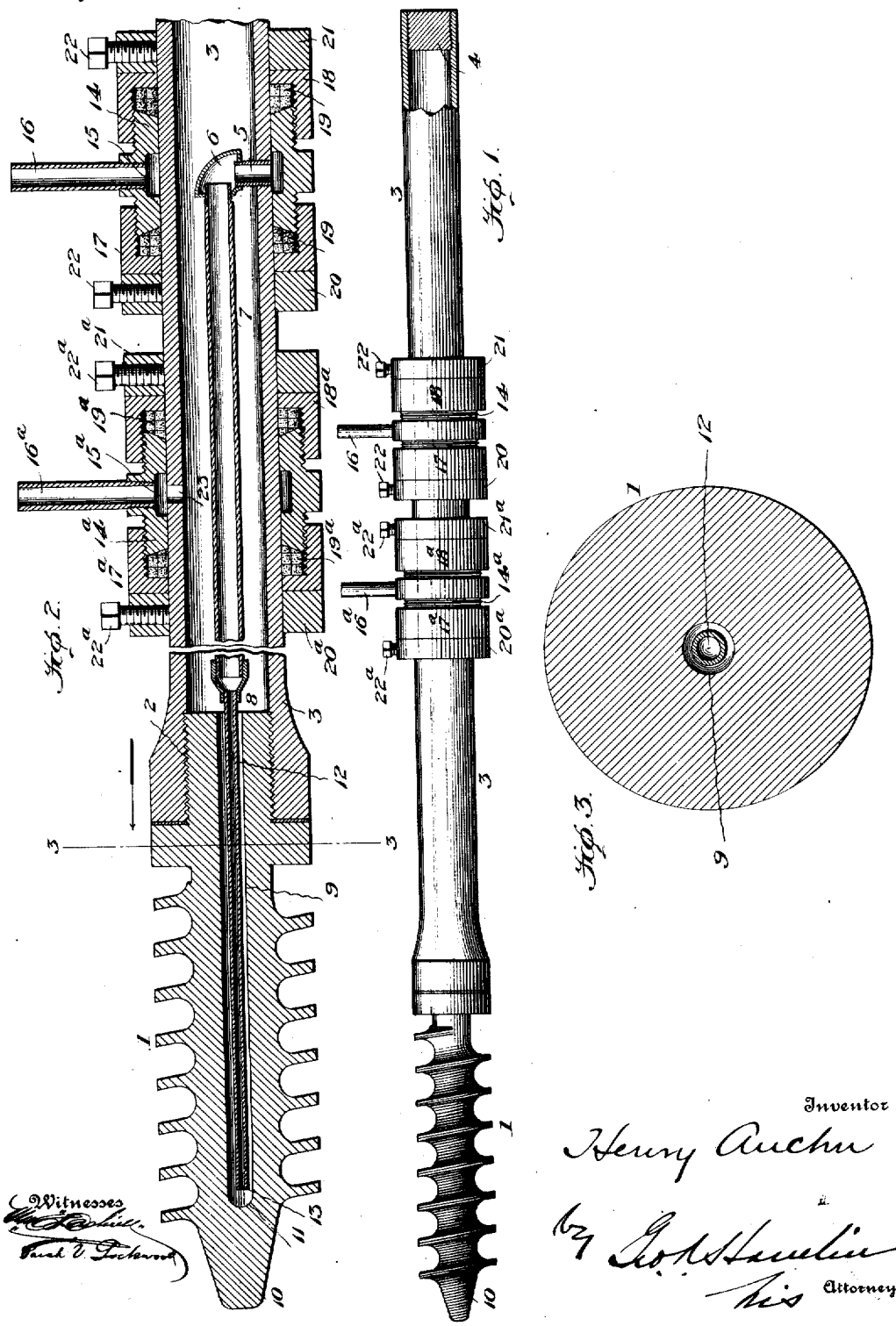

HENRY AUCHU, OF EMPORIUM, PENNSYLVANIA.

EXPRESSING OR PACKING SCREW.

No. 902,850.　　　　Specification of Letters Patent.　　　　Patented Nov. 3, 1908.

Application filed September 24, 1907. Serial No. 394,426.

*To all whom it may concern:*

Be it known that I, HENRY AUCHU, a citizen of the United States, residing at Emporium, county of Cameron and State of Pennsylvania, have invented certain new and useful Improvements in Expressing or Packing Screws, of which the following is a specification.

My invention relates to expressing or packing screws generally and, more particularly, to those which are used in machines for forming explosive gelatin into a cartridge or rope.

Packing or expressing screws are commonly used for forcing a plastic substance through a nozzle, die, or opening to give the material shape. The pressure, and friction of the screw and the material, generates considerable heat which is very dangerous when the material operated on is an explosive, explosive gelatin being an instance, as an explosion may result if the rotation of the screw and packing or expressing operation be continued when the screw is hot. In machines for packing explosive through a nozzle to form it into a rope or cartridge, the heat generated in the packing screw becomes very noticeable during operation and care has to be exercised to prevent the temperature from rising too high, necessitating stoppage or slowing down of the machine with incident loss of time and labor, and diminution of output and profits.

To remedy the foregoing defect, the present invention has for its object the provision of means for cooling packing or expressing screws regardless of the use to which they may be put, material operated on etc., though particularly intended for those employed in machines for packing explosive gelatin, comprising a novel arrangement and construction of parts whereby the screw may be continuously cooled without interfering with the operation thereof, enabling the machine using the screw to be operated continuously.

The invention is set forth fully hereinafter and its novel features are recited in the appended claims.

In the accompanying drawings:—Figure 1 is a view in side elevation; Fig. 2 is a longitudinal vertical section enlarged with intermediate parts broken away; and Fig. 3 is an enlarged section on line 3—3 of Fig. 1.

The materials of which the parts are constructed are not essential to the invention but are indicated as showing what would be most suitable when the invention is embodied in a packing screw for explosive gelatin packing machines.

The bronze screw or worm 1 is provided with a screw threaded connection 2 with its steel shaft 3, the latter being hollow throughout its length and closed at its extremity by a screw plug 4. Extending inwardly of the shaft 3 and screwed thereto is a nipple 5 which screws into an elbow 6. Screwed into the elbow and extending centrally within the shaft 3 is a pipe 7 which terminates short of the end of screw coupling 2, being there provided with a screw threaded coupling 8.

The screw 1 has a water chamber 9 extending centrally thereof from its inner end to a point located well toward its tip 10, being there rounded at 11. This chamber 9 may extend further into tip 10 or may be shorter than as shown.

Screwed into the coupling 8 is a brass pipe 12 of considerably smaller size than the chamber 9 and located centrally thereof, said pipe being open at its end 13 opposite the end 11 of chamber 9. The pipe 12 is preferably of less diameter than pipe 7 so that the water pressure in pipe 12 is heightened and the water caused to jet with considerable force against the rounded end 11. The pipes 7 and 12 rotating with the screw and shafts, the nipple and elbow form a sufficiently rigid support therefor. The detachability of the pipe 12 renders it an easy matter to unscrew it from pipe 7 and remove it with screw 1 after the latter has been unscrewed from shaft 3, the arrangement permitting the use of differently pitched or sized packing screws with the same shaft.

Surrounding shaft 3 is a stationary brass sleeve 14 having an internal annular water channel 15 located opposite the nipple 5 to supply the water thereto, a feed pipe 16 being coupled to this sleeve to supply the channel. Screwed on to opposite ends of sleeve 14 are brass glands 17 and 18 having packing 19. Steel collars 20 and 21, which are adjustably secured to shaft 3 by set screws 22, hold the glands in the position to which they are adjusted. The arrangement described permits adjustment of the sleeve along shaft 3 so that the water channel 15 may be brought opposite the nipple regardless of any longitudinal adjustment of the shaft, the packing preventing any leakage of the water whether the screw is rotating or at rest.

The shaft 3 is provided with a water outlet 28. A sleeve 14ᵃ having annular water channel 15ᵃ, outlet pipe 16ᵃ, glands 17ᵃ and 18ᵃ, packing 19ᵃ, collars 20ᵃ, 21ᵃ, and set screws 22ᵃ similar to those described are employed in connection with the water outlet for the same purpose. The water entering channel 15 passes, via nipple 5, to the pipes 7 and 12 and issues with considerable force against the end 11, returning in the chamber 9 around pipe 12 to the shaft 3, thence passing through outlet 23. The circulation of the water cools both the packing screw and shaft 3, while directing the water against the end of the screw cools this, the part which heats quickest and greatest.

In machines for packing explosive gelatin, as heretofore, there has been no means whereby the temperature of the packing screw can be ascertained, owing to its inclosure in a case, the operator having no way of determining whether the temperature of the screw was approaching the danger point, but with the present invention, he is assured at all times that as long as the return water is issuing from the outlet 16ᵃ, from which it may be collected in any desired way, there is no danger to be feared from an explosion from this source.

Having thus described my invention, what I claim as new, and desire to secure by Letters Patent, is:—

1. The combination with a packing screw and a shaft detachably connected thereto, of detachable means for supplying a cooling medium to the interior of said screw.

2. The combination with a packing screw and a shaft detachably connected thereto, of detachable means for supplying a cooling medium to the interior of said screw comprising a pipe composed of detachable sections.

3. The combination with a packing screw and a shaft detachably connected thereto, of detachable means for supplying a cooling medium to the interior of said screw comprising a pipe composed of detachable sections one of which is located loosely within the packing screw and the other being located within the shaft.

4. The combination with a hollow packing screw and detachable hollow shaft therefor which are interiorly in communication, of means for supplying a cooling medium to the interior of the packing screw, and means for taking off the cooling medium from the hollow shaft.

5. The combination with a hollow packing screw and hollow shaft therefor which are interiorly in communication, of a pipe extending longitudinally within the hollow shaft and longitudinally within the packing screw and rotatable therewith, means for supplying a cooling medium to said pipe, and means for taking off the cooling medium from the hollow shaft.

6. The combination with a hollow packing screw and hollow shaft therefor which are interiorly in communication, of a pipe extending longitudinally within the hollow shaft and longitudinally within the packing screw, said pipe being attached to and rotating with the shaft and opening to the exterior thereof, a stuffing box in which the shaft is rotatable having a channel communicating with the pipe opening aforesaid, an outlet for said shaft, and a stuffing box in which the shaft is rotatable having a channel communicating with the outlet aforesaid.

In testimony whereof, I hereunto affix my signature in presence of two witnesses.

HENRY AUCHU.

Witnesses:
H. A. Cox,
Charles T. Logan.